(12) United States Patent
Yamagishi

(10) Patent No.: US 6,621,526 B1
(45) Date of Patent: Sep. 16, 2003

(54) COLORIMETRY CONVERTING APPARATUS

(75) Inventor: Toru Yamagishi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/413,804

(22) Filed: Oct. 7, 1999

(30) Foreign Application Priority Data

Nov. 25, 1998 (JP) .............................................. 10-334443

(51) Int. Cl.[7] .............................. H04N 9/64; H04N 9/67
(52) U.S. Cl. ........................ 348/659; 348/453; 345/604
(58) Field of Search ................................ 348/453, 659, 348/660, 661, 645, 649, 652, 654; 345/589, 591, 600, 603, 604, 605; 358/1.9, 515, 523; H04N 9/64, 9/67

(56) References Cited

U.S. PATENT DOCUMENTS

| | | | | |
|---|---|---|---|---|
| 5,668,890 A | * | 9/1997 | Winkelman | 382/167 |
| 5,706,290 A | * | 1/1998 | Shaw et al. | 340/390 |
| 5,805,175 A | * | 9/1998 | Priem | 345/509 |
| 5,894,300 A | * | 4/1999 | Takizawa | 345/154 |
| 6,191,823 B1 | * | 2/2001 | Ahn | 348/554 |
| 6,256,068 B1 | * | 7/2001 | Takada et al. | 348/441 |

FOREIGN PATENT DOCUMENTS

JP        5-211651        8/1993

* cited by examiner

Primary Examiner—Michael H. Lee
Assistant Examiner—Brian Yenke
(74) Attorney, Agent, or Firm—Louis Woo

(57) ABSTRACT

A plurality of video signals of which colorimetries are different with each other are inputted. YCrCb-to-RGB conversion circuits converts at least two video signals having different colorimetries to an RGB color signal having a single colorimetry with matrixes corresponding to the colorimetries switched. An RGB-to-YCrCb conversion circuit may be further provided to convert the RGB color signal to a YCrCb signal again to supply it to a display with colorimetry matched to the display.

9 Claims, 4 Drawing Sheets

FIG. 4
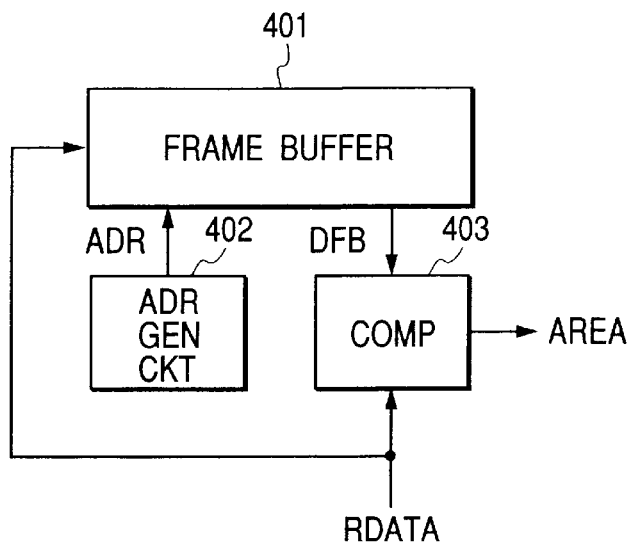
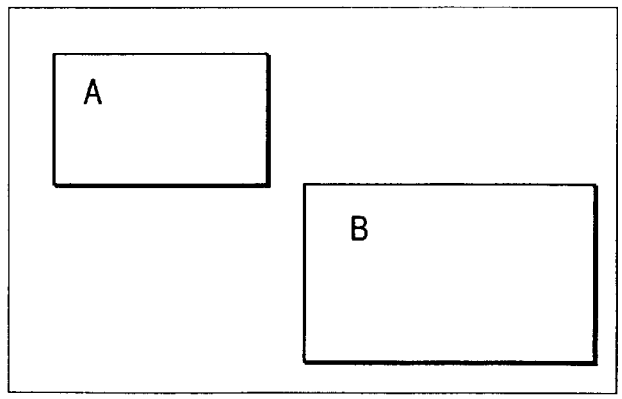
FIG. 5A
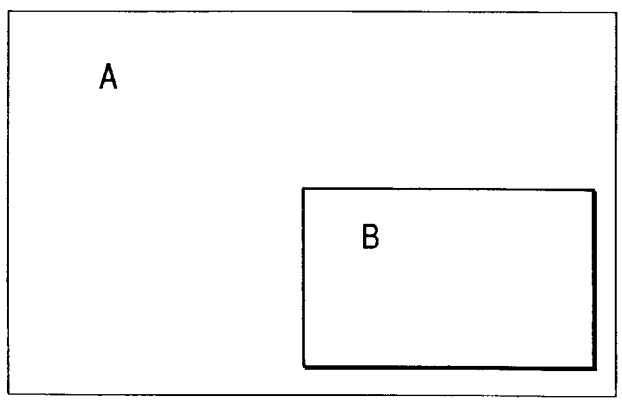
FIG. 5B

COLORIMETRY CONVERTING APPARATUS

BACKGROUND OF THE INVENTION

1. Field of the Invention

This invention relates to a colorimetry converting apparatus.

2. Description of the Prior Art

A colorimetry converting apparatus for converting a single video signal having a colorimetry to another single video signal having different colorimetry is known.

There are various types of video signals having different formats which are compressed by different compression methods. For example, the motion picture video signal is compressed in accordance with MPEG (Motion Picture Expert Group) 2 and the still picture signal is compressed in accordance with JPEG (Joint Photographic Coding Experts Group). Moreover, characters are represented by characters codes and figures are expressed by the PNG (portable Network Graphics) format.

Both the MPEG 2 and JPEG use Y (luminance), Cr and Cb (Color difference signals) as original data. On the other hand, graphics data like PNG uses RGB as original data. However using the same Y, Cr, Cb as original data, the transfer matrix from YCrCb to RGB (or vice versa) is different among various compression or graphic formats.

For the monitors, RGB and YCrCb are both used. So when the monitor has YCrCb inputs, RGB signal should be again transferred to YCrCb signal according to the colorimetry of the monitor.

Moreover, conversion methods of satellite broadcast video signals are different from one country to another country.

On the other hand, in U.S.A. 1080I format (which is interlace scan and the effective lines are 1080) and 720P format (which is progressive scan and the effective lines are 720) have the colorimetry of BT 709, while 480I format (which is interlace scan and the effective lines are 480) and 480P format (which is progressive scan and the effective lines are 480) have the colorimetry of BT601.

Moreover, in the case of the monitor, both in U.S.A. and Japan, the video signals according to 1080I and 720P format should be inputted using the colorimetry BT709, while the video signals according to 480I and 480P format should be inputted using the colorimetry BT601.

Moreover, the colorimetry most frequently used in JPEG data is SMPTE (Society of Motion Picture and Television Engineers) 240M.

The following equations Eq. 1, Eq. 2, and Eq. 3 are conversion equations for converting RGB video signals according to BT601, BT709, and SMPTE 240M to YCrCb video signals, respectively. The following equations Eq. 4, Eq. 5, and Eq. 6 are conversion equations for converting YCrCb video signals according to BT601, BT709, and SMPTE 240M to RGB video signals, respectively.

$$\begin{vmatrix} Ey \\ Ecr \\ Ecb \end{vmatrix} = \begin{vmatrix} 0.299 & 0.587 & 0.114 \\ 0.5 & -0.419 & -0.081 \\ -0.169 & -0.331 & 0.5 \end{vmatrix} \begin{vmatrix} Er \\ Eg \\ Eb \end{vmatrix} \quad (EQ.\ 1)$$

$$\begin{vmatrix} Ey \\ Ecr \\ Ecb \end{vmatrix} = \begin{vmatrix} 0.2126 & 0.7152 & 0.0722 \\ 0.5 & -0.454 & -0.046 \\ -0.115 & -0.385 & 0.5 \end{vmatrix} \begin{vmatrix} Er \\ Eg \\ Eb \end{vmatrix} \quad (EQ.\ 2)$$

$$\begin{vmatrix} Ey \\ Ecr \\ Ecb \end{vmatrix} = \begin{vmatrix} 0.212 & 0.701 & 0.087 \\ 0.5 & -0.445 & -0.055 \\ -0.116 & -0.384 & 0.5 \end{vmatrix} \begin{vmatrix} Er \\ Eg \\ Eb \end{vmatrix} \quad (EQ.\ 3)$$

$$\begin{vmatrix} Er \\ Eg \\ Eb \end{vmatrix} = \begin{vmatrix} 1.0 & 1.4016867602 & -0.0009267448 \\ 1.0 & -0.7141690400 & -0.3436953845 \\ 1.0 & 0.0009902205 & 1.7721604157 \end{vmatrix} \begin{vmatrix} Ey \\ Ecr \\ Ecb \end{vmatrix} \quad (EQ.\ 4)$$

$$\begin{vmatrix} Er \\ Eg \\ Eb \end{vmatrix} = \begin{vmatrix} 1.0 & 1.5749131625 & 0.0004920110 \\ 1.0 & -0.4683216869 & -0.1874855952 \\ 1.0 & 0.0016223285 & 1.8557492542 \end{vmatrix} \begin{vmatrix} Ey \\ Ecr \\ Ecb \end{vmatrix} \quad (EQ.\ 5)$$

$$\begin{vmatrix} Er \\ Eg \\ Eb \end{vmatrix} = \begin{vmatrix} 1.0 & 1.5758476316 & -0.0006567605 \\ 1.0 & -0.4765290206 & -0.2264181923 \\ 1.0 & 0.0003776373 & 1.8259584599 \end{vmatrix} \begin{vmatrix} Ey \\ Ecr \\ Ecb \end{vmatrix} \quad (EQ.\ 6)$$

In Eqs. 1 to 6, each Ey is an analog value from zero to one, each Ecr and each Ecb are analog values from −0.5 to 0.5 and each Er, each Eg, and each Eb are analog values from zero to one.

Moreover, values of digital values of Y, Cr, and Cb actually used in MPEG method are calculated in accordance with the following equation.

$Y = 219 \times Ey + 16$ $Cr = 224 \times Ecr + 128$ $Cb = 224 \times Ecb + 128$ \hfill (EQ. 7)

As mentioned, the conversion equations, that is, colorimetries are different each other among the compression methods or standards (formats) of video signals. The prior art colorimetry conversion apparatus converts one type of video signal having one colorimetry to another video signal having another colorimetry independently.

SUMMARY OF THE INVENTION

The aim of the present invention is to provide a superior colorimetry converting apparatus.

According to this invention, there is provided a first colorimetry converting apparatus including: an input circuit for receiving a plurality of input video signals respectively having different first colorimetries; and a colorimetry converting circuit for converting the input video signals to a single output video signal having a second colorimetry.

In the first colorimetry converting apparatus, the different types of input video signals may be inputted to the input circuit in parallel.

In the first colorimetry converting apparatus, the different types of input video signals may be successively inputted to the input circuit.

In the first colorimetry converting apparatus, the outputting circuit may time-divisionally output the second video signals within a frame of the single output video signal.

The first colorimetry converting apparatus may further include an area signal generation circuit for generating an area signal indicative of a partial area of a frame of the single output video signal. The colorimetry converting circuit converts one of the input video signals to the single output video signal at the partial area and converts another one of the input video signals at outside of the partial area in accordance with the area signal.

Each of the input video signals in the first colorimetry converting apparatus may include a luminance signal and color difference signals and the colorimetry converting circuit includes, as a second colorimetry converting apparatus, a first switch for outputting a part of the input video signals, a first converting circuit converting the part of input video signals from the first switch to RGB-color signals in accordance with the colorimetries of the part of input video signals from the first switch respectively, a second switch for outputting one of the RGB-color signals, and a second converting circuit for converting the RGB-color signal to the single video signal including a luminance signal and color difference signals.

The first colorimetry converting apparatus may further include, as a third colorimetry converting apparatus, another input circuit for receiving an input RGB-color signal. Each of the input video signals includes a luminance signal and color difference signals. The colorimetry converting circuit includes a first switch for outputting a part of the input video signals, a first converting circuit respectively converting the part of input video signals from the first switch to RGB-color signals in accordance with the colorimetries of the part of input video signals from the first switch respectively, a second switch for outputting one of the RGB-color signals and the input RGB-color as a converted RGB-color signal, and a second converting circuit for converting the converted RGB-color signal to the single output video signal including a luminance-signal and color difference signals to have the second colorimetry.

The second colorimetry converting apparatus may further include, as a fourth colorimetry converting apparatus, an area signal generation circuit for generating an area signal indicative of at least a partial area of a frame of the single output video signal, a switching signal generation circuit for generating first to third switching signals respectively supplied to the first switch, the first converting circuit, and the second switch such that one of the input video signals is converted into the single video signal at the partial area and another one of the input video signals is converted at outside of the partial area in accordance with the area signal.

The second colorimetry converting apparatus may further include, as fifth colorimetry converting apparatus, a switching signal generation circuit for generating first to third switching signals respectively supplied to the first switch, the first converting circuit, and the second switch in response to a vertical synchronizing signal.

In the third colorimetry converting apparatus, the switching signal generation circuit may further generate fourth switching signal supplied to the second converting circuit which converts the RGB-color signal to the single output video signal in response to the vertical synchronizing signal.

The fourth colorimetry converting apparatus may further include an operation switch for generating a setting signal. The second converting circuit converts the RGB-color signal to the single output video signal in accordance with the setting signal.

In the first colorimetry converting apparatus, colorimetries of the input video signals change respectively according to the time.

In the first colorimetry converting apparatus, a colorimetry of output signal can change according to the time.

In the first colorimetry converting apparatus may further include an area signal generation circuit for generating area signals indicative of partial areas of a frame of the output video signal. The partial area corresponds to each the input video signal, the colorimetry converting circuit converts colorimetry of each input video signal according to the corresponding area signal.

In the first colorimetry converting apparatus may further include an additional input circuit for RGB-color signals. The converting circuit includes a first switch for outputting a part of the luminance and color difference input video signals, a first converting circuit respectively converting the part of input video signals from the first switch to RGB-color signals in accordance with the colorimetry of the part of input video signals from the first switch respectively, a second switch for outputting an selected RGB-color signal among one of the RGB-color signals from the first converting circuit and the additional input circuit, and a second converting circuit for converting the RGB-color signal to the single video output signal of luminance and color difference to have the further different colorimetry.

In the second colorimetry converting apparatus may further include an area signal generation circuit for generating area signals indicative of an area in a frame of the single output video signal, a switching signal generation circuit for generating switching signals corresponding to each of input video signals respectively supplied to the first switch, the first converting circuit, and the second switch such that each of the input video signals is converted into the single video signal according to its corresponding area signal.

The third colorimetry converting apparatus may further include an area signal generation circuit for generating area signals indicative of an area in a frame of the single output video signal, a switching signal generation circuit for generating switching signals corresponding to each of input video signals respectively supplied to the first switch, the first converting circuit, and the second switch such that each of the input video signals is converted into the single video signal according to its corresponding area signal.

In the second colorimetry converting apparatus may further include, as a sixth colorimetry converting apparatus, a switching signal generation circuit for generating switching signals corresponding to each input video signals respectively supplied to the first switch, the first converting circuit, and the second switch. The switching signals change during vertical blanking period.

The third colorimetry converting apparatus may further include a switching signal generation circuit for generating switching signals corresponding to each input video signals respectively supplied to the first switch, the first converting circuit, and the second switch. The switching signals change during a vertical blanking period.

In the sixth colorimetry converting apparatus, the switching signal generation circuit may further generate a fourth switching signal supplied to the second coverting circuit which converts the RGB-color signal to the single video signal. The switching signal changes during a vertical blanking period.

BRIEF DESCRIPTION OF THE DRAWINGS

The object and features of the present invention will become more readily apparent from the following detailed description taken in connection with the accompanying drawings in which:

FIG. 4 is a block diagram of another example of the area signal generation circuit shown in FIG. 1;

FIGS. 5A and 5B are illustrations for illustrating the operation of colorimetry conversion apparatus according to this embodiment.

The same or corresponding elements or parts are designated with like references throughout the drawings.

DETAILED DESCRIPTION OF THE INVENTION

Hereinbelow will be described an embodiment of this invention.

Figure 1:
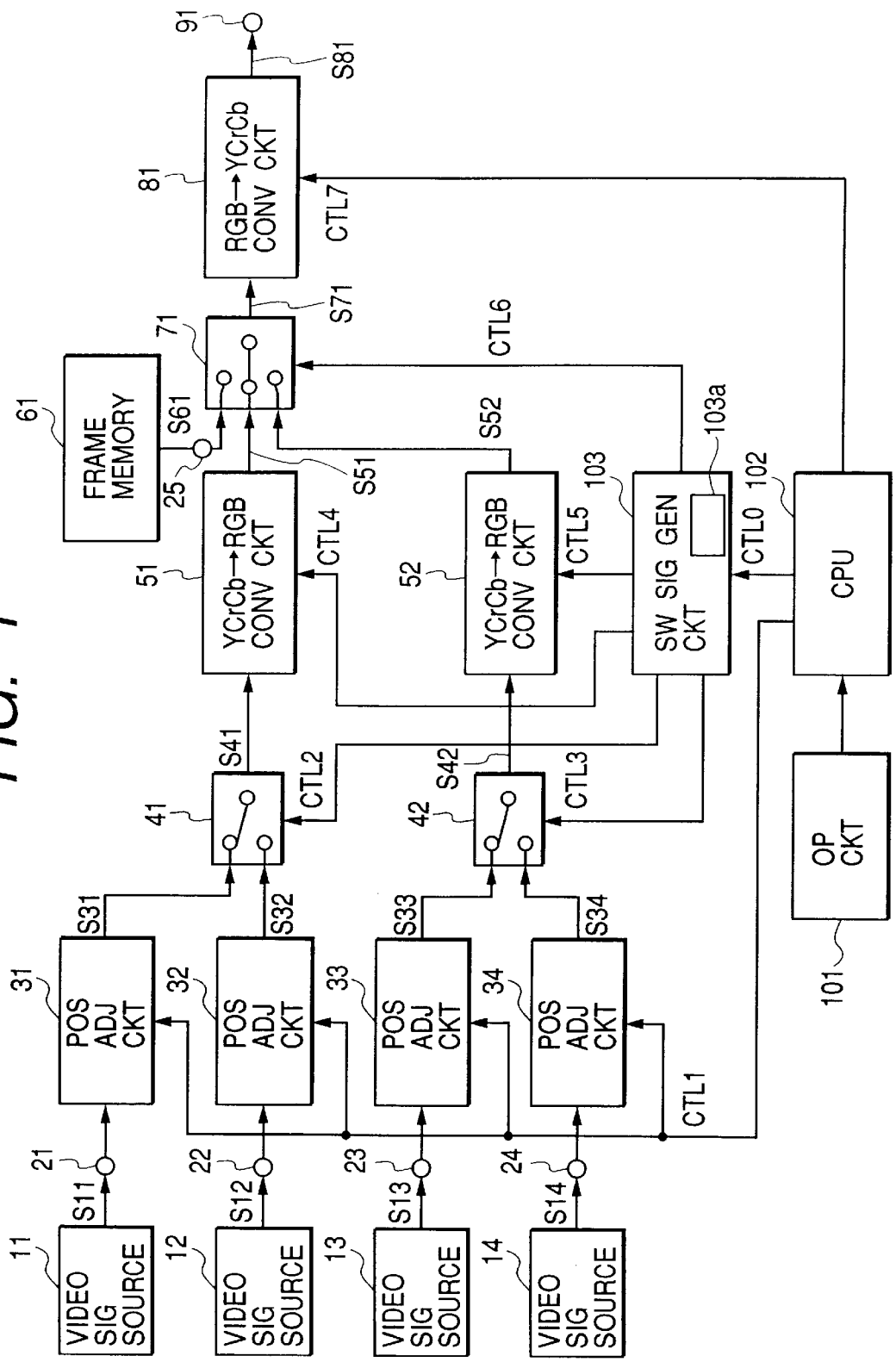
FIG. 1 is a block diagram of a colorimetry conversion apparatus according to this embodiment.

FIG. 1 is a block diagram of a colorimetry conversion apparatus according to this embodiment. The colorimetry conversion apparatus according to this embodiment includes input terminals 21, 22, 23, and 24 for inputting YCrCb video signals from video signal sources 11, 12, 13, and 14, each of the YCrCb video signals including a luminance signal Y and color difference signals Cr and Cb, an output terminal 91 to be coupled to a display monitor (not shown), position adjusting circuits 31, 32, 33, and 34 for controlling positions of screen images of the video signals S11, S12, S13, and S14 supplied to the input terminals 21 to 24 on the screen of the display monitor, a switch circuit 41 for outputting either of the output signal S31 of the position adjusting circuit 31 or the output signal S32 of the position adjusting circuit 32, a switch circuit 42 for outputting either of the output signal S33 of the position adjusting circuit 33 or the output signal S34 of the position adjusting circuit 34, a YCrCb-to-RGB conversion circuit 51 for converting a YCrCb signal S41 from the switch circuit 41 to an RGB signal S51, a YCrCb-to-RGB conversion circuit 52 for converting a YCrCb signal S42 from the switch circuit 42 to an RGB video signal S52, an RGB video frame memory 61 for storing one frame of an RGB video data, a switch circuit 71 for outputting either of the RGB signal S61 from the RGB video frame memory 61 via an input terminal 25, the RGB video signal S51, or the RGB video signal S52, an RGB-to-YCrCb conversion circuit 81 for converting the RGB signal S71 from the switch circuit 71 to a YCrCb signal S81, an operation circuit 101, a CPU (Central Processing Unit) 102, and a switching signal generation circuit 103.

The video signal sources 11 to 14 respectively output YCrCb signals S11 to S14 according to standards of BT601 or BT709 recommended by ITU (International Telecommunication Union), or SEMPTE (Society of Motion Picture and Television Engineers) 240 having different colorimetries. For example, such a video signal source includes an MPEG decoder in a receiver for receiving the digital broadcast, a converter for converting an analog video signal to a digital YCrCb signal with a/d converters, a frame memory for a still picture, and a JPEG decoder.

FIGS. 5A and 5B are illustrations for illustrating the operation of colorimetry conversion apparatus according to this embodiment.

The position adjusting circuits 31 to 34 adjust the sizes and positions of screen areas A and B with respect to a frame of the YCrCb signal S81 in accordance with a control signal CTL1 from the CPU 102. The position adjusting circuits 31 to 34 may include frame memories or frame synchronizers according to the needs of making the output signals S31 to S34 of the position adjusting circuits 31 to 34 synchronous with a single vertical synchronizing signal and a single horizontal synchronizing signal.

The switch circuit 41 outputs either of the output signal S31 of the position adjusting circuit 31 or the output signal S32 of the position adjusting circuit 32 in accordance with a switching control signal CTL2 from the switching signal generation circuit 103 and the switch circuit 42 outputs either of the output signal S33 of the position adjusting circuit 33 or the output signal S34 of the position adjusting circuit 34 in accordance with a switching control signal CTL3 from the switching signal generation circuit 103.

Each of the YCrCb-to-RGB conversion circuits 51 and 52 includes the conversion matrixes of Eqs. 4 to 6 and selects and effects one of two conversion matrixes in accordance with the switching control signal CTL4 or CTL5 supplied from the switching signal generation circuit 103 to convert the inputted YCrCb signal to an RGB video signal in accordance with the colorimetry of the inputted YCrCb video signal.

Figure 2A:
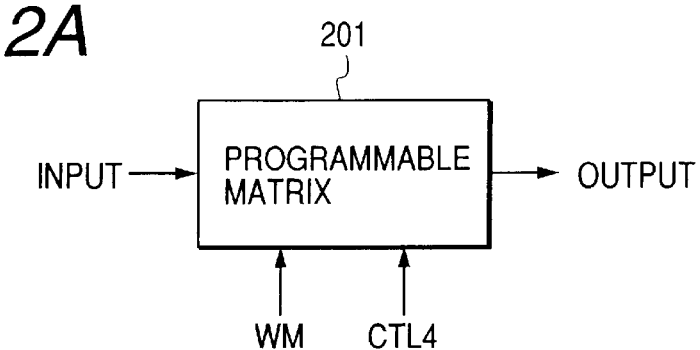
FIGS. 2A and 2B are block diagrams of the YCrCb-to-RGB conversion circuits shown in FIG. 1.
Figure 2B:
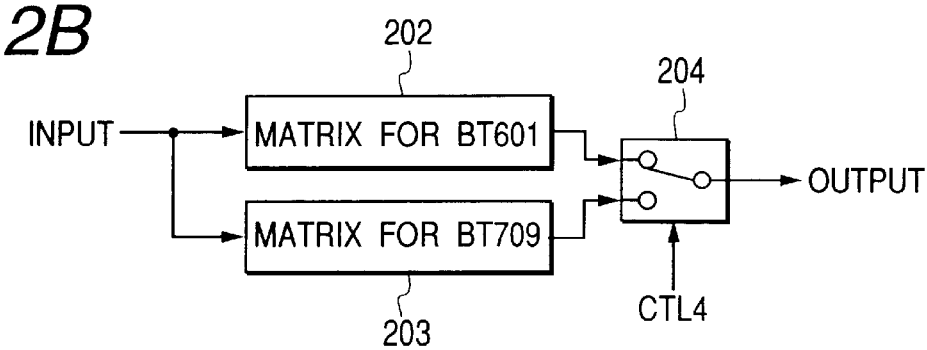

FIGS. 2A and 2B are block diagrams of the YCrCb-to-RGB conversion circuit 51. In FIG. 2A, a programmable matrix circuit 201 includes a plurality of registers (not shown) for storing a plurality sets of matrix data and one of registers is selected in accordance with the switching control signal CTL4 to execute the matrix operation in accordance with the colorimetry of the video signal inputted to the programmable matrix circuit 201. The matrix data of respective registers are written with matrix data from the CPU 102 in accordance with writing command WM.

In FIG. 2B, the YCrCb-to-RGB conversion circuit 51 includes a matrix for BT601 202 and a matrix for BT709 203, and a switch 204 for outputting either of the outputs of the matrix 202 or 203 in accordance with the switching control signal CTL4. The YCrCb-to-RGB conversion circuit 52 has the same structure as the YCrCb-to-RGB conversion circuit 51. However, the matrix data is different for different conversion operations in accordance with the colorimetry of the video signal inputted to the YCrCb-to-RGB conversion circuit 52.

The RGB video frame memory 61 stores one frame of an RGB video data, that is, the RGB video frame memory 61 may always store the same video data. Moreover, it is also possible that the RGB video data is renewed by the CPU 102. That is, the RGB frame memory 61 acts as a video signal source of RGB type.

The switch circuit 71 effects switching in accordance with the switching control signal CTL6 from the switching signal generation circuit 103.

The RGB-to-YCrCb conversion circuit 81 converts the RGB output signal S71 to a YCrCb signal in accordance with colorimetry of the display monitor to be coupled to the output terminal 91. The conversion matrix of the RGB-to-YCrCb conversion circuit 81 can be set by the CPU 102 through the control signal CTL7 which is synchronously switched during the vertical blanking period in response to the vertical synchronizing signal.

The operation circuit 101 includes an operation panel (not shown) including operation switches or a remote control unit (not shown) for operating the colorimetry converting apparatus. For example, an operator operates the operation circuit 101 to command switching the colorimetry of the input video signals S11 to S14 and the colorimetry of the YCrCb signal S81.

The CPU 102 controls the whole of the colorimetry converting apparatus. For example, the CPU 102 supplies the control signals CTL1 and CTL7 to the position adjusting circuits 31 to 34 and the RGB-to-YCrCb conversion circuit 81 and supplies the control signal CTL0 to the switching signal generation circuit 103 to command switching of the video signals and switching colorimetries in accordance with the switched video signal.

The switching signal generation circuit 103 includes an area signal generation circuit 103a for generating an area signal AREA indicating display areas of the inputted video signals S11 to S14 and the RGB video signal S61, the horizontal synchronizing signal HSYNC, and the vertical synchronizing signal VSYNC. The area signal generation circuit 103a has two operation modes. The CPU 102 controls switching between two operation modes. In the first operation mode, switching control signals are outputted just as they are set by the CPU 102. In the second operation mode, the area signal AREA is outputted as the switching control signals.

Figure 3:
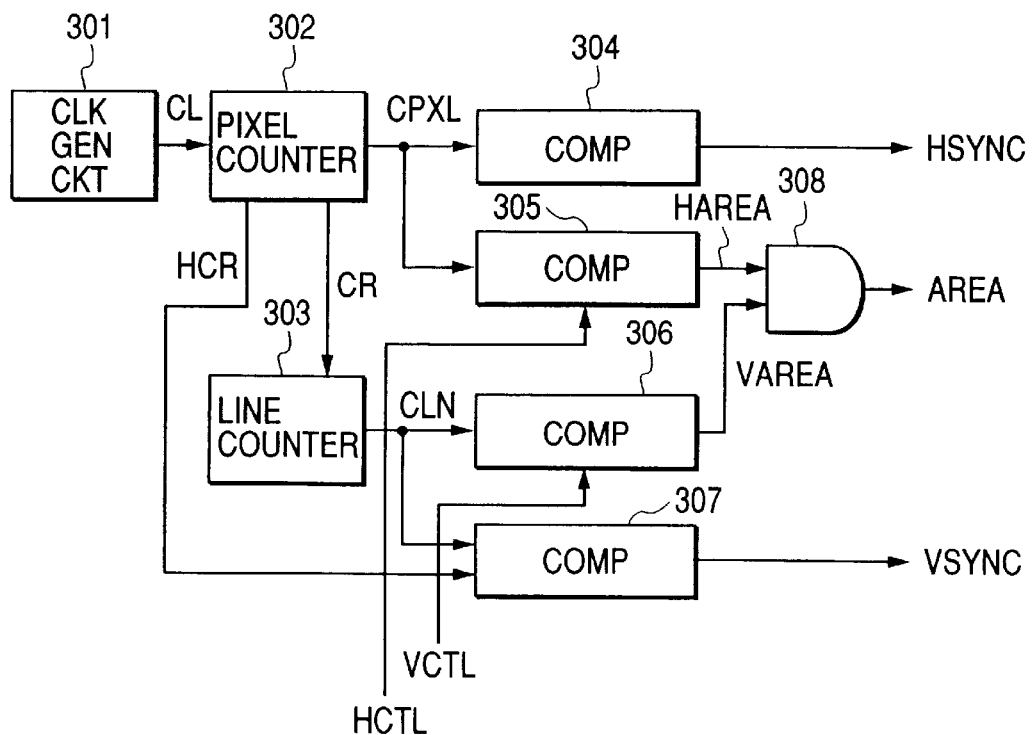
FIG. 3 is a block diagram of the area signal generation circuit shown in FIG. 1.

FIG. 3 is a block diagram of the area signal generation circuit 103a according to this embodiment. The area signal generation circuit 103a generates the area signal AREA of which logic level goes to H at the area B and to L at the other area in the case shown in FIG. 5B.

The area signal generation circuit 103a includes a clock signal generation circuit 301 for generating a pixel clock pulse CL which corresponds to one pixel on a frame, a pixel counter 302 for counting the pixel clock pulse CL, that is, counting the number of pixels in the horizontal direction, a line counter 303 for counting a carry signal CR outputted by the pixel counter 302, a comparator 304 for generating the horizontal synchronizing signal HSYNC in accordance with the count value CPXL of the pixel counter 302, a comparator 305 for generating a horizontal area signal HAREA in accordance with the count value CPXL of the pixel counter 302, a comparator 306 for generating a vertical area signal VAREA in accordance with the count value CLN of the line counter 303, a comparator 307 for generating the vertical synchronizing signal VSYNC in accordance with the count value CLN of the line counter 303 and a half carry signal HCR outputted by the pixel counter 302, and an AND gate 308.

In is assumed that the pixel counter 302 counts from zero to 2199. Then, the carry signal CR is outputted when the count value CPXL returns to zero from 2199. On the other hand, the half carry signal HCR is outputted when the count value CPXL becomes to 1100 from 1099.

The line counter 303 counts the carry signal CR, that is, counts the number of lines in the vertical direction, for example, from zero to 562.

The comparator 304 outputs the horizontal synchronizing signal HSYNC when the count value CPXL of the pixel counter 302 exists in the range from zero to 43. The comparator 305 outputs H level when the count value CPXL exists in the range (X1 to X2) commanded by the area control signal HCTL supplied by the CPU 102 and outputs L level when the count value CPXL does not exist in the range. The comparator 306 outputs the vertical area command signal VAREA which becomes H level when the count value CLN of the line counter 303 exists at the range of Y1 to Y2 commanded by the vertical area control signal VCTL supplied by the CPU 102 and becomes L level when the count value CLN is outside the range. The comparator 307 outputs the vertical synchronizing signal VSYNC when the count value CLN of the comparator 307 exists at the range from zero to five.

The AND gate 308 outputs the area signal AREA which becomes H when both the horizontal area command signal HAREA and the vertical area command signal VAREA are H levels.

In the case of the interlace scanning, the line counter 303 counts the lines of zero to 562 at odd fields and counts the lines of zero to 561 at even fields. Moreover, the comparator 307 outputs the vertical synchronizing signal VSYNC when the count value CLN is from zero to five at odd fields and, at even fields, the comparator 307 outputs the vertical synchronizing signal VSYNC from the timing that the count value CLN is zero and the half carry signal HCR is outputted to the timing that count value CLN is five and the half carry signal HCR is outputted.

The horizontal area control signal HCTL and the vertical area control signal VCTL supplied by the CPU 102 in response to operation to the operation circuit 101 including operation switches are included in the control signal CTL0 (shown in FIG. 1). Moreover, the horizontal synchronizing signal HSYNC and the vertical synchronizing signal VSYNC are supplied to the position adjusting circuits 31 to 34.

FIG. 4 is a block diagram of another example of the area signal generation circuit shown in FIG. 1. The area signal generation circuit 103a includes a frame buffer 401 for storing one frame of data, an address signal generation circuit 402 for generating an address signal ADR supplied to the frame buffer 401, and a comparing circuit 403 for comparing data RDATA written by the CPU 102 with the data DFB from the frame buffer 401.

The frame buffer 401 has a plurality of planes including an alpha plane. The alpha plane stores data with respect to every pixel of the video signal S81. The predetermined area on the alpha plane stores data of "1" at the lowest bit to provide correspondence with the area B shown in FIG. 5B. That is, the alpha plane stores control data for switching data from other frame buffers pixel by pixel or for an alpha blend process which is mentioned later.

The address signal generation circuit 402 generates an address signal ADR such that the data DFB in the frame buffer 401 is successively read in the order of displaying. The comparing circuit 403 compares the data DFB with data from the CPU 102 to detect the data of "1" at the lowest bit of the data DFB to output H level at the predetermined area B and output L level outside the predetermined area B in the case shown in FIG. 5B.

The CPU 102 stores the data RDATA in the alpha plane as the data DFB in response to operation to the operation circuit 101 including operation switches and then, outputs the data supplied to the comparing circuit 403 to detect the lowest bit indicating "1". In the case shown in FIG. 5A, the lowest second bit may be further used.

If the structure shown in FIG. 4 is used as the area signal generation circuit, the CPU 102 can write in the arbitrary address with arbitrary data to the frame buffer 401. Sot the data RDATA may be written in the frame buffer as not only a rectangle shape but also a circle, an oval, or any shape. Then, the area signal AREA is generated in accordance to the arbitrary shape. When the data is read from the frame buffer, the comparing circuit 403 compares the data with the pre-stored RDATA. If the read data agrees with the pre-stored RDATA, the area signal AREA becomes H level.

The data stored in the frame buffer 401 may be graphic data for example. The graphic data may be limited within 256 colors or 16.7 million colors. For example, if the area signal AREA indicating the region B shown in FIG. 5B is generated, a predetermined data, for example, data indicative of blue color, is stored over the memory area of the frame buffer 401 corresponding to the area B. Then, the data DFB is read in response to the address signal ADR from the address signal generation circuit 402 and the comparing circuit 403 compares the data DFB with the data from the CPU 102, that is, the data indicative of the blue color. If the both data agree with each other, the comparing circuit 403 outputs H level as the area signal and when both data disagree with each other, the comparing circuit 403 outputs L level.

A first mode of the colorimetry apparatus will be described.

In the first mode, only one of the input video signals S11 to S14 or the RGB signal S61 is continuously displayed or only one of the input video signals S11 to S14 or the RGB signal S61 is displayed in response to the command by the operator or a selection command generated by the program executed by the CPU 102, a plurality of input video signals S11 to S14 or the RGB signal S61 are successively displayed on the display. That is, switching is effected between successive two frames at the vertical or horizontal blanking period, that is, in response to the vertical synchronizing signal VSYNC or the horizontal synchronizing signal HSYNC.

In this mode, the CPU 102 supplies the control signal CTL0 including a switching signal SSW corresponding to the signal from the operation circuit 101 or the command from the program being executed and an operation mode signal SMD indicative of the first mode to the switching signal generation circuit 103. In response to this, the switching signal generation circuit 103 generates the switching control signals CTL2 and CTL3 for the switches 41 and 42 corresponding to the switching signal SSW and the switching control signals CTL4 and CTL5 for switching the matrixes in the YCrCb-to-RGB conversion circuits 51 and 52 corresponding to the switching signal SSW and the switching signal CTL6 for the switch circuit 71 corresponding to the switching signal SSW.

Therefore, in the first mode, the source of the video signal displayed over the display screen is changed to another video signal in response to the selection operation by the operator or the selection command from the CPU 102. With switching the source of video signal, the colorimetry is switched in accordance with the colorimetry of the displayed video signal to convert the video signal to be displayed into the RGB video signal to provide correct color expression. Moreover, the RGB-to-YCrCB conversion circuit 81 converts the RGB signal from the switch 71 to the YCrCb signal to display images with correct colors.

In the second mode, more than one input video signals are displayed on the screen within one frame. That is, different color signals having different colorimetries are displayed on a plurality of areas on the screen on the display as shown in FIG. 5A or 5B.

In this mode, the CPU 102 supplies the control signal CTL0 including the area control signals (HCTL and VCTL or RDATA) corresponding to the command from the executed program and the operation mode signal SMD indicative of the second mode to the switching signal generation circuit 103. The switching signal generation circuit 103 supplies the area control signal HCTL and other control signals to the area signal generation circuit 103a and supplies the area signal AREA outputted by the area signal generation circuit 103a as the switching control signals CTL2, CTL3, CTL4, CTL5 and CTL6 to respective portions.

In this case, not all switching control signals CTL2 to CTL6 may be generated from the area signal AREA but the area signal AREA is used for generating a portion of the switching control signals in accordance with the utilizing condition of the video signal sources 11 to 14.

For example, if the areas A and B respectively correspond to the video signals S11 and S12 from the video signal sources 11 and 12, the switching control signals CTL2 and CTL3 are generated from the area signal AREA and the switching control signal CTL6 is generated to select the video signal S51. Moreover, it is assumed that the areas A and B respectively correspond to the video signals S11 and S13 from the video signal sources 11 and 13. The switching control signal CTL2 is generated to select the video signal (output signal) S31 and the switching control signal CTL3 is generated to select the video signal S33. Moreover, the switching control signal CTL4 is generated to select the colorimetry corresponding to the video signal S31 and the switching control signal CTL5 is generated to select the colorimetry corresponding to the video signal S33 and the switching control signal CTL6 is generated from the area signal AREA.

As mentioned above, in the second mode, in the case that a plurality of video signals having different colorimetries inputted in parallel are displayed at different areas on the display screen at the same time (on one frame), the video signals for the different areas are converted to the RGB video signal having a single colorimetry, so that all video signals at different areas on the display screen can be displayed with correct colors. Moreover, as similar to the first mode, the RGB-to-YCrCb conversion circuit 81 converts the RGB signal inputted thereto to the YCrCb signal having the colorimetry suitable for the display and the conversion matrix can be changed in accordance with the type of the display, so that all video signals at different areas on the display screen can be displayed with correct colors if the type of the display is changed.

The above-mentioned first and second modes are basic operation modes of the colorimetry conversion apparatus. However, the combination of the first and second mode operations are applicable to this colorimetry converting apparatus. That is, this colorimetry converting apparatus can deal with the following case:

A plurality of video signals having different colorimetries are displayed on different areas on the display screen and then, the colorimetries of all or a part of video signals are changed.

Modification will be described.

In the above-mentioned embodiment, the number of the video signal sources for supplying the YCrCb signals is four and the signal source for supplying the RGB signal is one. However, the number may be greater or smaller. Moreover, the colorimetry converting apparatus according to this invention is applicable to the case that the video signal source is a single but the colorimetry of the outputted video signal changes in time base.

Moreover, the number of the areas on the display screen more than that shown in FIG. 5B. In this case, other video signal sources and corresponding switches and the YCrCb-to-RGB conversion circuits and other circuits described above are further provided.

Moreover, the switch 71 may be structured with a circuit for adopting the alpha blending process (alpha-blending). The alpha blending process is given by:

$$EBLD = \alpha \times E1(R,G,B) + (1-\alpha) \times E2(R,G,B)$$

wherein E1 (R, G, B) and E2 (R, G, B) are levels of the input RGB signals and EBLD is a signal level of the output signal after the blend process and α is a coefficient from zero to one. If α=0, E2 is selected and if α=1, E1 is selected and if 0<α<1, the blended video signal of two video signals is outputted in accordance with the value of α.

Figure 6:
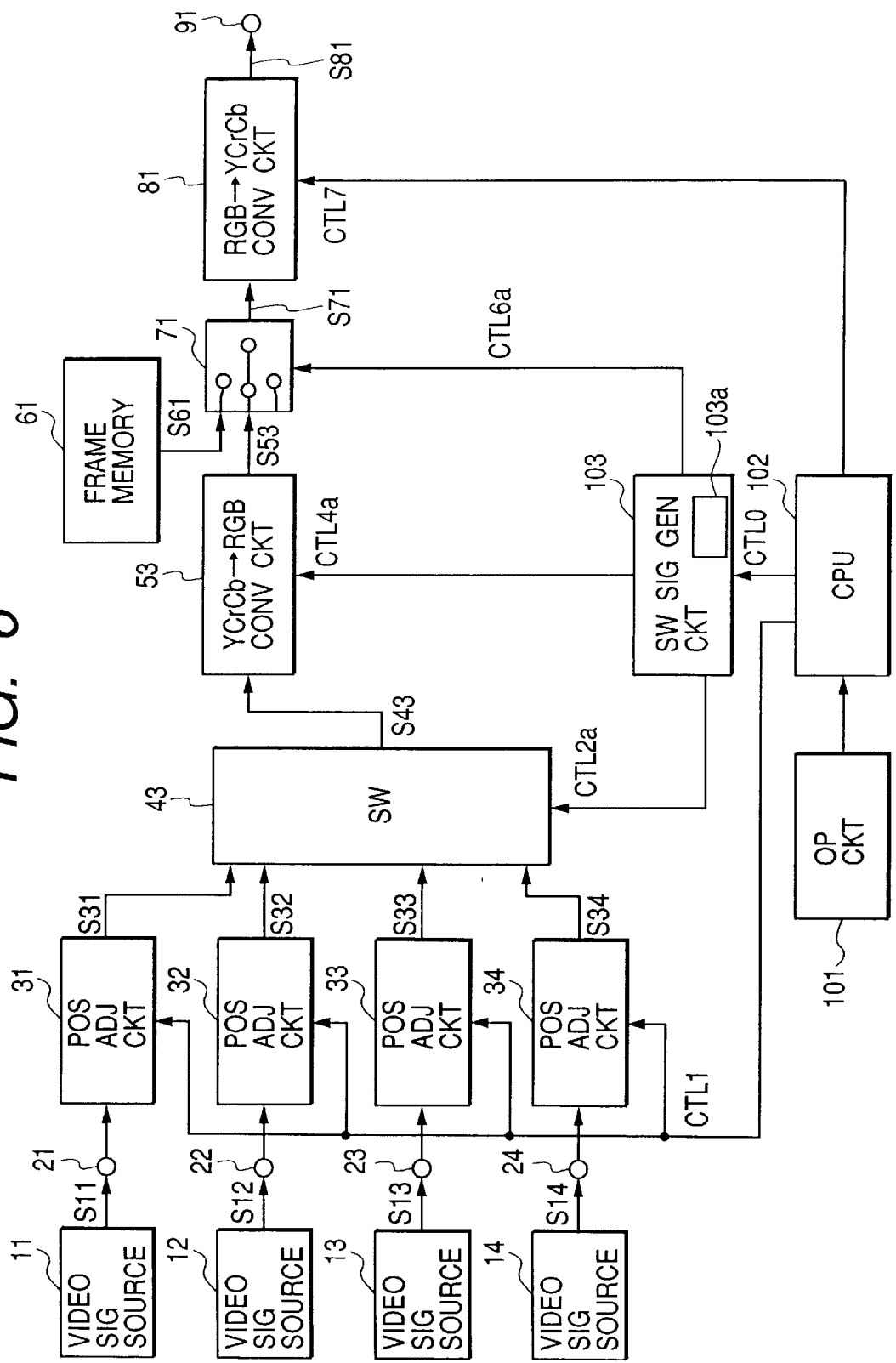
FIG. 6 is a block diagram of a modification of the colorimetry conversion apparatus.

FIG. 6 is a block diagram of a modification of the colorimetry converting apparatus.

As shown in FIG. 6, the switch 43 replaces the switches 41 and 42 shown in FIG. 1 and the YCrCb-to-RGB conversion circuit 53 replaces the YCrCb-to-RGB conversion circuits 51 and 52 shown in FIG. 1. In this case, the YCrCb-to-RGB conversion circuit 53 effects the colorimetry conversion with one of four different colorimetry conversion matrixes. The switching control signal CTL4a commands the YCrCb-to-RGB conversion circuit 53 to select one of the four different colorimetry conversion matrixes. Moreover, the switching control signal CTL6a commands the switch 71 to select either of the video signal S53 or S61.

Moreover, if the display to be coupled to the output terminal 91 should be supplied with an RGB signal, such a display is directly supplied with the video signal S71.

Moreover, a plurality of frame memories may be provided as the frame memories 61 shown in FIGS. 1 and 6. In this case, the number of inputs of the switch 71 is increased.

As mentioned, a plurality of video signals of which colorimetries are different with each other are inputted in parallel or in time base are converted into the video signal having a single colorimetry, so that the different video signals having the different colorimetries can be displayed with correct colors.

What is claimed is:

1. A colorimetry converting apparatus, comprising:
   input means for receiving a plurality of input video signals respectively having different first colorimetries;
   synchronizing means for synchronizing said input video signals with a single vertical synchronizing signal for a display monitor;
   colorimetry converting means for converting said synchronized video signals to a single output video signal having a second colorimetry;
   wherein each of said input video signals includes a luminance signal and color difference signals and said colorimetry converting means includes a first switch for outputting a part of said input video signals, first converting means converting said part of synchronized video signals from said first switch to RGB-color signals in accordance with said colorimetries of said part of synchronized video signals from said first switch respectively, a second switch for outputting one of said RGB-color signals, and second converting means for converting said RGB-color signal to said single video signal including a luminance signal and color difference signals;
   said colorimetry converting apparatus further comprising area signal generation means for generating an area signal indicative of at least a partial area of a frame of said single output video signal, switching signal generation means for generating first to third switching signals respectively supplied to said first switch, said first converting means, and said second switch such that one of said synchronized video signals is converted into said single video signal at said partial area and another one of said synchronized video signals is converted at outside of said partial area in accordance with said area signal.

2. A colorimetry converting apparatus as claimed in claim 1, further comprising operation switch means for generating a setting signal, wherein said second converting means converts said RGB-color signal to said single output video signal in accordance with said setting signal.

3. A colorimetry converting apparatus, comprising:
   input means for receiving a plurality of input video signals respectively having different first colorimetries;
   synchronizing means for synchronizing said input video signals with a single vertical synchronizing signal for a display monitor;
   colorimetry converting means for converting said synchronized video signals to a single output video signal having a second colorimetry;
   wherein each of said input video signals includes a luminance signal and color difference signals and said colorimetry converting means includes a first switch for outputting a part of said input video signals, first converting means converting said part of synchronized video signals from said first switch to RGB-color signals in accordance with said colorimetries of said part of synchronized video signals from said first switch respectively, a second switch for outputting one of said RGB-color signals, and second converting means for converting said RGB-color signal to said single video signal including a luminance signal and color difference signals; and
   switching signal generation means for generating first to third switching signals respectively supplied to said first switch, said first converting means, and said second switch in response to a vertical synchronizing signal.

4. A colorimetry converting apparatus as claimed in claim 3, wherein said switching signal generation means further generates a fourth switching signal supplied to said second converting means which converts said RGB-color signal to said single output video signal in response to said vertical synchronizing signal.

5. A colorimetry converting apparatus, comprising:
   input means for receiving a plurality of input video signals respectively having different first colorimetries;
   synchronizing means for synchronizing said input video signals with a single vertical synchronizing signal for a display monitor;
   colorimetry converting means for converting said synchronized video signals to a single output video signal having a second colorimetry;
   wherein each of said input video signals includes a luminance signal and color difference signals and said colorimetry converting means includes a first switch for outputting a part of said input video signals, first converting means converting said part of synchronized video signals from said first switch to RGB-color signals in accordance with said colorimetries of said part of synchronized video signals from said first switch respectively, a second switch for outputting one of said RGB-color signals, and second converting means for converting said RGB-color signal to said single video signal including a luminance signal and color difference signals; and
   area signal generation means for generating area signals indicative of an area in a frame of said single output video signal, switching signal generation means for generating switching signals corresponding to each of said synchronized video signals respectively supplied to said first switch, said first converting means, and said second switch such that each of said synchronized video signals is converted into said single video signal according to its corresponding area signal.

6. A colorimetry converting apparatus, comprising:

input means for receiving a plurality of input video signals respectively having different first colorimetries;

synchronizing means for synchronizing said input video signals with a single vertical synchronizing signal for a display monitor;

colorimetry converting means for converting said synchronized video signals to a single output video signal having a second colorimetry;

another input means for receiving an input RGB-color signal synchronized with a single vertical synchronizing signal, wherein each of said input video signals includes a luminance signal and color difference signals, said colorimetry converting means includes a first switch for outputting a part of said synchronized video signals, first converting means respectively converting said part of said synchronized video signals from said first switch to RGB-color signals in accordance with said colorimetries of said part of synchronized video signals from said first switch respectively, a second switch for outputting one of said RGB-color signals and said input RGB-color as-a converted RGB-color signal, and second converting means for converting said converted RGB-color signal to said single output video signal including a luminance signal and color difference signals to have said second colorimetry; and area signal generation means for generating area signals indicative of an area in a frame of said single output video signal, switching signal generation means for generating switching signals corresponding to each of said synchronized video signals respectively supplied to said first switch, said first converting means, and said second switch such that each of said synchronized video signals is converted into said single video signal according to its corresponding area signal.

7. A colorimetry converting apparatus, comprising:

input means for receiving a plurality of input video signals respectively having different first colorimetries;

synchronizing means for synchronizing said input video signals with a single vertical synchronizing signal for a display monitor;

colorimetry converting means for converting said synchronized video signals to a single output video signal having a second colorimetry;

wherein each of said input video signals includes a luminance signal and color difference signals and said colorimetry converting means includes a first switch for outputting a part of said input video signals, first converting means converting said part of synchronized video signals from said first switch to RGB-color signals in accordance with said colorimetries of said part of synchronized video signals from said first switch respectively, a second switch for outputting one of said RGB-color signals, and second converting means for converting said RGB-color signal to said single video signal including a luminance signal and color difference signals; and switching signal generation means for generating switching signals corresponding to each synchronized video signals respectively supplied to said first switch, said first converting means, and said second switch, said switching signals changing during a vertical blanking period.

8. A colorimetry converting apparatus as claimed in claim 7, wherein said switching signal generation means further generating a fourth switching signal supplied to said second coverting means which converts said RGB-color signal to said single video signal, said switching signal changes during vertical blanking period.

9. A colorimetry converting apparatus, comprising:

input means for receiving a plurality of input video signals respectively having different first colorimetries;

synchronizing means for synchronizing said input video signals with a single vertical synchronizing signal for a display monitor;

colorimetry converting means for converting said synchronized video signals to a single output video signal having a second colorimetry;

another input means for receiving an input RGB-color signal synchronized with a single vertical synchronizing signal, wherein each of said input video signals includes a luminance signal and color difference signals, said colorimetry converting means includes a first switch for outputting a part of said synchronized video signals, first converting means respectively converting said part of said synchronized video signals from said first switch to RGB-color signals in accordance with said colorimetries of said part of synchronized video signals from said first switch respectively, a second switch for outputting one of said RGB-color signals and said input RGB-color as a converted RGB-color signal, and second converting means for converting said converted RGB-color signal to said single output video signal including a luminance signal and color difference signals to have said second colorimetry; and switching signal generation means for generating switching signals corresponding to each synchronized video signals respectively supplied to said first switch, said first converting means, and said second switch, said switching signals changing during a vertical blanking period.

* * * * *